United States Patent [19]
Ort et al.

[11] Patent Number: 5,617,502
[45] Date of Patent: Apr. 1, 1997

[54] SYSTEM AND METHOD SYNCHRONIZING AUDIO AND VIDEO DIGITAL DATA SIGNALS DURING PLAYBACK

[75] Inventors: Jeffrey Ort, Kirkland, Wash.; Daniel Daum, San Jose, Calif.

[73] Assignee: Cirrus Logic, Inc., Fremont, Calif.

[21] Appl. No.: 620,637

[22] Filed: Mar. 22, 1996

[51] Int. Cl.$^6$ ............................. H04N 5/76; H04N 5/928
[52] U.S. Cl. ................................. 386/97; 386/96; 386/106
[58] Field of Search ................................. 386/65, 95, 96, 386/104, 46, 97, 98, 111, 54, 106, 39; 348/423, 552, 512, 515; 370/100.1, 94.2; 395/2.69; H04N 5/76

[56] References Cited

U.S. PATENT DOCUMENTS

| | | | |
|---|---|---|---|
| 5,333,299 | 7/1994 | Koval et al. | 370/100.1 |
| 5,351,092 | 9/1994 | Poimboeuf et al. | 386/104 |
| 5,396,497 | 3/1995 | Veltman | 370/100.1 |
| 5,410,343 | 4/1995 | Coddington | 455/4.2 |
| 5,502,573 | 3/1996 | Fijinami | 386/95 |
| 5,508,816 | 4/1996 | Ueda et al. | 386/104 |

*Primary Examiner*—Andrew Faile
*Assistant Examiner*—Huy Nguyen
*Attorney, Agent, or Firm*—Wagner, Murabito & Hao

[57] ABSTRACT

A method and system for synchronizing audio and video data signals that are in a signal format wherein the audio and video data signals are not interleaved but originate from separate sources and arrive at a constant frame rate. In one embodiment, the audio and video data signals are in an Moving Pictures Expert Group (MPEG) format. Portions of the novel system operate within the hardware of a video processor unit and portions of the novel system operate within a software driver of a computer system that receives the audio and video data signals. Audio and video data signals are referenced by a presentation time stamp (e.g., VPTS for video and APTS for audio) encoded in the data. Using these stamps, the novel system (via the video processor unit) determines if the video signal is ahead or behind the audio signal by a small number of frames, x, and if so, the video processor unit either pauses or skips frames in its video display unit hardware to regain synchronization. If the video processor unit determines that the video signal is ahead or behind the audio signal by more than x frames, a software driver operating on the computer system is informed of the difference and the software driver instructs the video processor unit to skip or pause frames within its system parsing unit hardware using a host interrupt driven mechanism to regain synchronization. Using this method, the digital video signal is effectively synchronized to the reference digital audio signal.

20 Claims, 9 Drawing Sheets

SYSTEM AND METHOD SYNCHRONIZING AUDIO AND VIDEO DIGITAL DATA SIGNALS DURING PLAYBACK

FIELD OF THE INVENTION

The present invention relates to the field audio and video playback systems. More specifically, the present invention relates to computer controlled audio and video playback systems that utilize digital audio and video signals.

BACKGROUND OF THE INVENTION

Recent developments in computer technology have increased the storage capacity of media storage devices (e.g., hard disks, CD-ROMs, etc.) and have simultaneously increased the volatile memory storage capacity and data processing speeds of computer systems. These developments have facilitated using the computer system for processing and playback of signals representing motion pictures with associated sound recordings and other audio/visual multimedia recordings. An audio/video signal format has arisen called the Motion Picture Expert Group or MPEG format. The well known MPEG format, as described in international specifications ISO/IEC 11172-1 to ISO/IEC 11172-3, et seq., provides compressed and encoded digital audio and video signals from separate sources for data decompression and playback on computer systems. Specifically, the MPEG format offers an effective mechanism for intelligently compressing and decompressing digital video and audio signals and providing the decompressed signals to a playback mechanism.

In the past, most digitally recorded audio and video data signal formats interleaved the audio and video data in a single signal. In an interleaved format, the audio signal corresponding to the video frame signal is positioned adjacent and in sequence with the video frame signal on the recorded media. In older audio/video signal formats, the audio and video data were also provided from the source in the same frame sequence that was used for playback.

These prior art video and audio display formats, due to the above characteristics, did not pose any special problems with regard to audio and video signal synchronization during playback. For instance, if the audio and the video data signals were interleaved, then the audio and video synchronization information is effectively pre-recorded by the position of the interleaved audio and video signals on the storage media. With an interleaved audio and video signal format, the playback system merely presents the audio and video signals to the rendering equipment in the order they were received without any special synchronization issues. In an audio and video signal format that receives information in sequence, it is also relatively simple to synchronize the audio and video signals because they typically are never more than one frame out of synchronization.

However, the MPEG encodes the audio and video digital signals in an intelligent manner which poses synchronization problems during playback. For instance, MPEG signals are provided in individual defined digital data packets for both audio and video data. The digital data packets are not provided to the playback system in order relative to their playback sequence. Rather, the audio and video data packets are provided to the playback system out of playback order with an encoded system clock reference indicating the intended time of presentation for each audio and video data packet. Importantly, within the MPEG format, the audio and video digital data is not interleaved, but rather originates and is provided by separate sources. The above characteristics pose synchronization difficulties for computer systems that are required to properly playback the MPEG audio and video data signals in synchronization.

Accordingly, it is desired to provide a playback system (e.g., a computer system or dedicated digital playback system) with the ability to properly synchronize audio and video signals during playback that originate in a signal format that does not interleave the audio and video data and does not supply the audio and video data in a playback order sequence. It is further desired to provide a playback system as described above for proper playback of audio and video signals in an MPEG recorded format.

SUMMARY OF THE INVENTION

The present invention includes a method and system for synchronizing audio and video data signals that are in a signal format wherein the audio and video data signals are not interleaved but originate from separate sources and arrive at a constant frame rate. In one embodiment, the audio and video data signals are in an Moving Pictures Expert Group (MPEG) format. Portions of the novel system operate within the hardware of a video processor unit and portions of the novel system operate within a software driver of a computer system that receives the audio and video data signals. Audio and video data signals are referenced by a presentation time stamp (e.g., VPTS for video and APTS for audio) encoded in the data. Using these stamps, the novel system (via the video processor unit) determines if the video signal is ahead or behind the audio signal by a small number of frames, x, and if so, the video processor unit either pauses or skips frames in its video display unit hardware to regain synchronization. If the video processor unit determines that the video signal is ahead or behind the audio signal by more than x frames, a software driver operating on the computer system is informed of the difference and the software driver instructs the video processor unit to skip or pause frames within its system parsing unit hardware using a host interrupt driven mechanism to regain synchronization. Using this method, the digital video signal is effectively synchronized to the digital audio signal. Using part software control, the video processor unit requires reduced circuit complexity and expense and the video processor unit offers enhanced design flexibility and compatibility.

Specifically, in a digital playback system including a video processor unit and a software driver, embodiments of the present invention include a method of synchronizing audio and video digital signals during playback comprising the steps of: (a) determining whether the audio and video digital signals are in synchronization or out of synchronization by a small number of frames, x, the step of determining performed by the video processor unit; (b) provided the audio and video digital signals are out of synchronization by x or less frames, performing a first step of synchronizing the video digital signal to the audio digital signal, the first step initiated and performed solely by the video processor unit; and (c) provided the audio and video digital signals are out of synchronization by more than x frames, performing a second step of synchronizing the video digital signal to the audio digital signal, the second step comprising the steps of: (i) the software driver instructing the video processor unit to perform a video frame synchronization procedure; and (ii) the video processor interrupting the software driver during the video frame synchronization procedure on a video frame basis until the software driver determines a completion point of the video frame synchronization procedure.

Embodiments of the present invention include the above wherein the first step comprises the steps of: the video processor unit skipping x or less video frames within a buffer of a video display unit provided the audio digital signal is ahead of the video digital signal, the video display unit containing decoded video data; and the video processor unit pausing x or less video frames, based on a system clock reference, provided the audio digital signal is behind the video digital signal and further wherein the step of the software driver instructing the video processor unit to perform a video frame synchronization procedure comprises the steps of: the software driver instructing the video processor unit to skip video frames within a system parsing unit containing decompressed video data, provided the audio digital signal is ahead of the video digital signal; and the software driver instructing the video processor unit to pause video frames, based on a system clock reference, provided the audio digital signal is behind the video digital signal. The present invention includes a playback system in accordance with the above.

DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

System Overview

Figure 1:
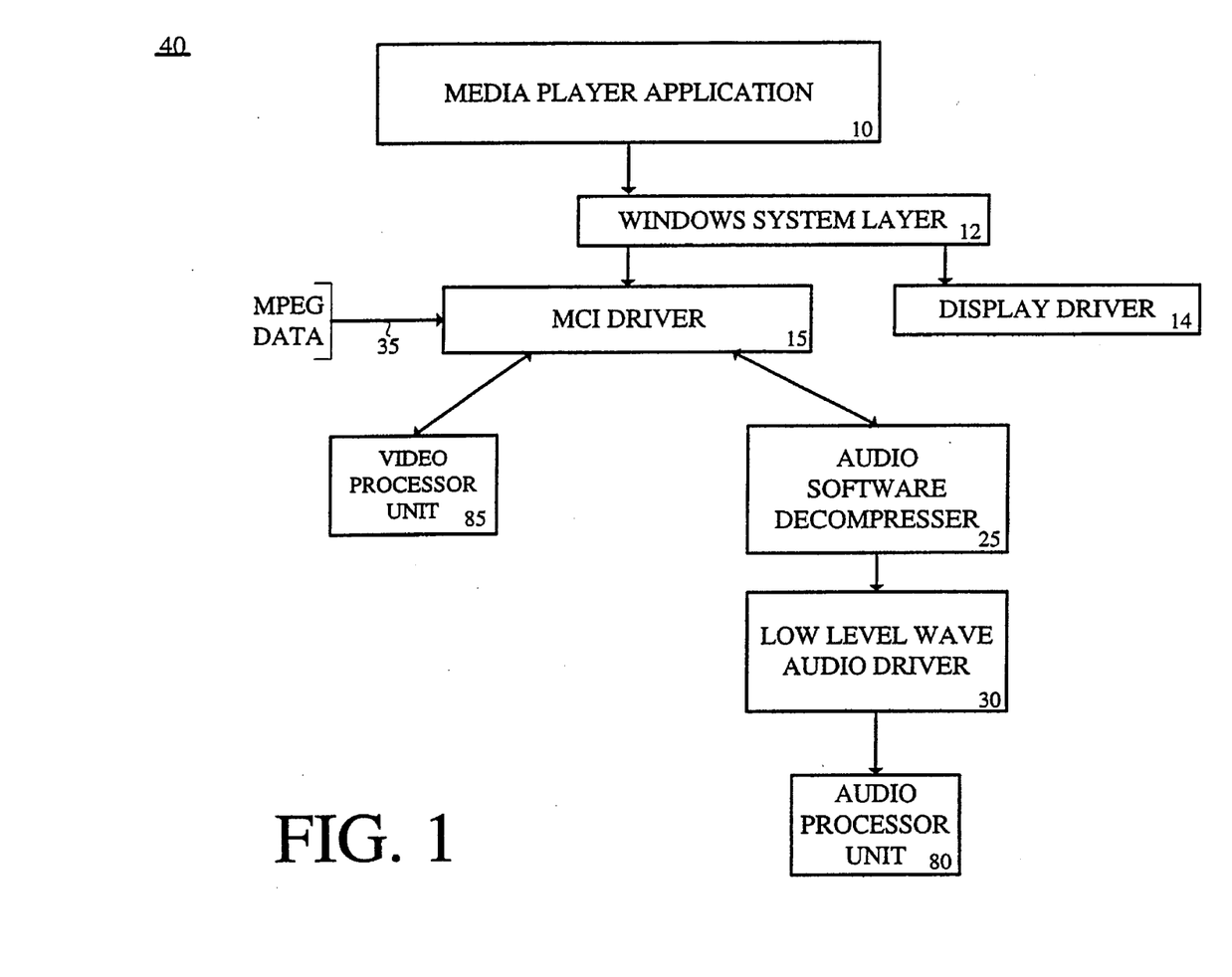
FIG. 1 is a diagram illustrating the logical layers between the software and hardware elements of the present invention audio/video synchronization procedure.

FIG. 1 shows a system overview 40 of the preferred embodiment of the present invention including different logical levels. Media player application 10 (application 10) is a software procedure executable within a computer system or dedicated digital playback system (hereinafter referred to as playback system 50, described in more detail with reference to FIG. 2). Application 10 of FIG. 1 typically interfaces with a user which selects a particular audio/video file (e.g., a motion picture with sound) to be played on the playback system 50. In the playback system 50, audio signals are sent to a sound generation device (e.g., a speaker) and video signals are rendered on a display screen. In accordance with the present invention, application 10 can be of a number of well known media player applications.

Application 10 interfaces with and controls a low level driver 15 which is a lower level software program to application 10. This control is executed through a system layer 12 (e.g., in one embodiment a Windows system layer 12). The system layer 12 also communicates with a display driver 14, which is not particularly pertinent to the present invention. In one embodiment, the low level driver 15 is an MCI type driver. The MCI driver 15 of the present invention contains low level function calls to the hardware units (e.g., video processor unit 85 and audio processor unit 80) and to other lower level software routines (e.g., audio software decompressor 25) to control the playback of the selected audio/video file. The specific computer implemented steps 300 within the MCI driver 15 that perform certain synchronization tasks in accordance with the present invention will be described further below. The MCI driver 15 opens filenames (e.g. representative of an audio/video file) that are supplied by application 10. MCI driver 15 also reads in the selected audio/video file from its source and performs any required initialization of the playback system 50 needed to play the selected audio/video file.

Application 10 and MCI driver 15 process audio and visual digital data within an MPEG format (the MPEG data). However, as will be evident from the synchronization procedures 300 of the present invention, the present invention can also operate with other audio/visual data signals formats in addition to the MPEG data format. As shown in FIG. 1, the MPEG data representative of the audio/video file is received over line 35 to the MCI driver 15. Alternatively, the MPEG data can also be directly supplied to application 10 which then transfers the MPEG data to MCI driver 15. Either implementation is considered within the scope of the present invention.

The MPEG audio and video data is formatted according to the above referenced MPEG specification. As is known, the digital audio and video MPEG data arrives from separate source (e.g., it is not interleaved) and does not arrive in playback order. However, the MPEG data does arrive at a constant frame rate.

The MCI driver 15 of the present invention, via software function calls, controls the processing of video MPEG data by controlling a video processor unit 85 by reading and writing to control registers. This video processor unit 85 is described in more detail with reference to FIG. 3. The video processor unit 85 can interrupt the MCI driver 15. The MCI driver 15 also controls processing of audio MPEG data by controlling a low level audio software decompressor 25. Audio software decompressor 25 can be one of a number of well known software routines that are executable within the playback system 50 and function to decompress audio MPEG data in accordance with the above referenced MPEG specifications.

Audio software decompressor 25 controls a low level wave audio driver 30 that is also executable within the playback system 50. A number of well known MCI or Microsoft based wave audio drivers can be used in accordance with the present invention. Low level wave audio driver 30 controls the presentation of audio signals (e.g., typically digital) to an audio processor unit 80. Audio processor unit 80 is a hardware sound generation device and typically is implemented as a plug-in circuit board to the playback system 50. In accordance with the present invention, several well known sound generation devices, such as a Sound Blaster™ products, Microsoft Sound™ products, Media Vision™ products, and similar products can be used as the audio processor unit 80. An audio time counter (e.g., 33 bit value at 90 kHz) is maintained by the above audio elements and is used by the present invention as a reference for synchronization.

Playback System 50

Figure 2:
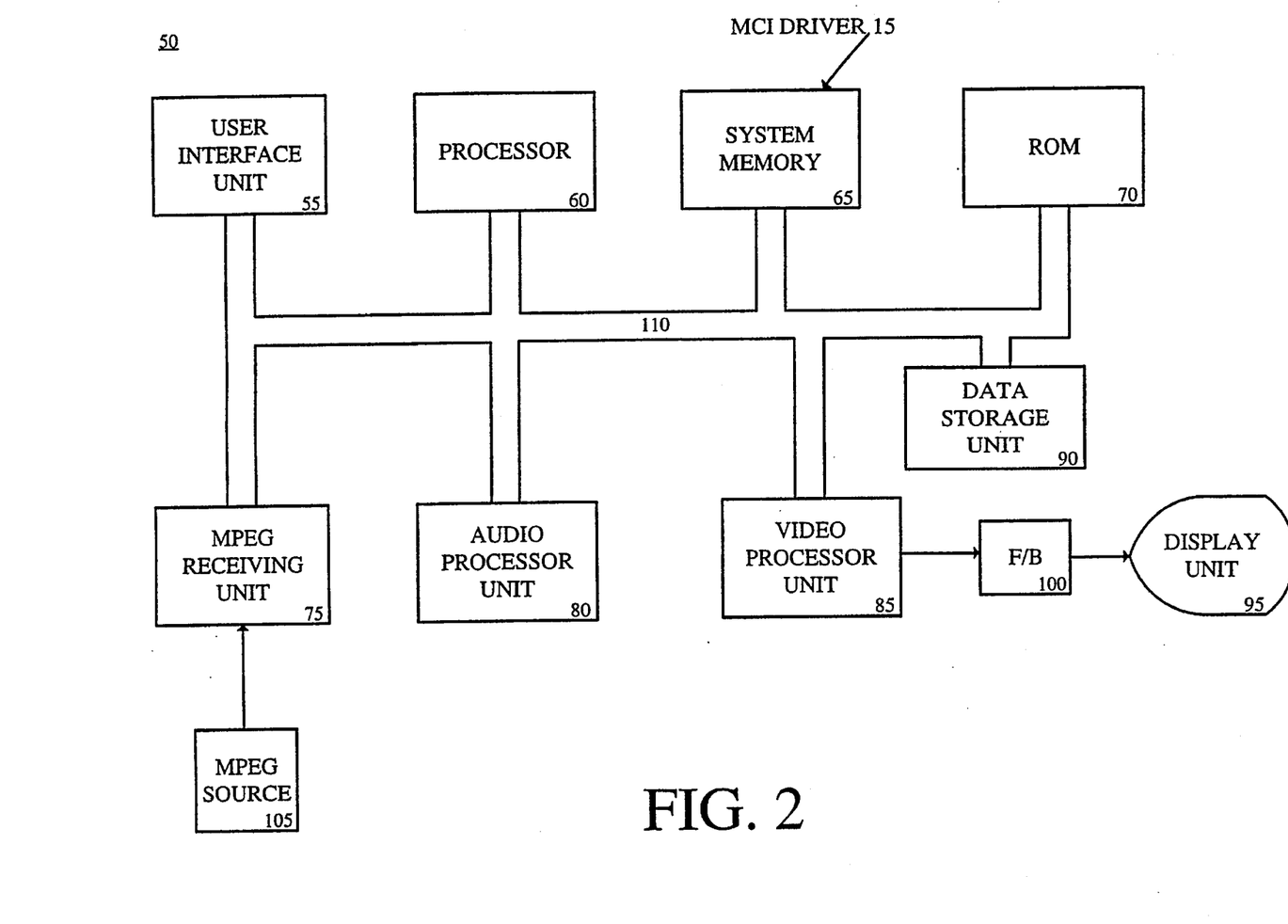
FIG. 2 is a logical hardware diagram illustrating an exemplary hardware platform of the present invention.

FIG. 2 illustrates a hardware block diagram of the playback system 50 as discussed above. The playback system 50 can be based on a computer system platform or can be based on a dedicated audio/visual playback system (e.g. similar to a television system). Play back system 50 contains an address/data bus 110 for carrying digital address and data signals. A processor 60 (e.g., a central processor) for executing instructions and processing data is connected to the address/data bus 110. Also connected to the address/data bus 110 is a computer readable system memory 65 which includes volatile memory (e.g., RAM) and can be used for storing program information and MPEG data. A computer readable non-volatile memory unit (e.g., ROM) 70 is coupled to address/data bus 110 and can be used for storing program information. An optional data storage device 90 (e.g., a disk drive, CD-ROM drive, or other optical drive) can also be coupled to address/data bus 110. Optionally, a user interface unit 55 can be coupled to address/data bus 110 which can include a keyboard and a cursor directing device.

FIG. 2 also includes hardware units for processing audio/video MPEG data. An MPEG receiving unit 75 and MPEG source 105 are used to receive the MPEG data into the playback system 50. The MPEG receiving unit 75 is coupled to address/data bus 110 for receiving MPEG data from the MPEG source 105. The MPEG receiving unit 75 can include a modem, a CD-ROM hardware controller unit, or a disk drive hardware controller unit, etc. The MPEG source 105 can include a CD-ROM device, a disk drive device, a computer network (e.g., the internet) or any other digital signal storage medium. Also coupled to address/bus 110 is the audio processor unit 80 and the video processor unit 85. The video processor 85 is also coupled to a frame buffer (F/B) unit 100 which typically contains volatile memory referred to as video memory. The F/B unit 100 is cyclically read by well known raster update circuitry to generate an analog or video output signal to a display unit 95 which can be CRT or flat panel based.

Video Processor Unit 85

Figure 3:
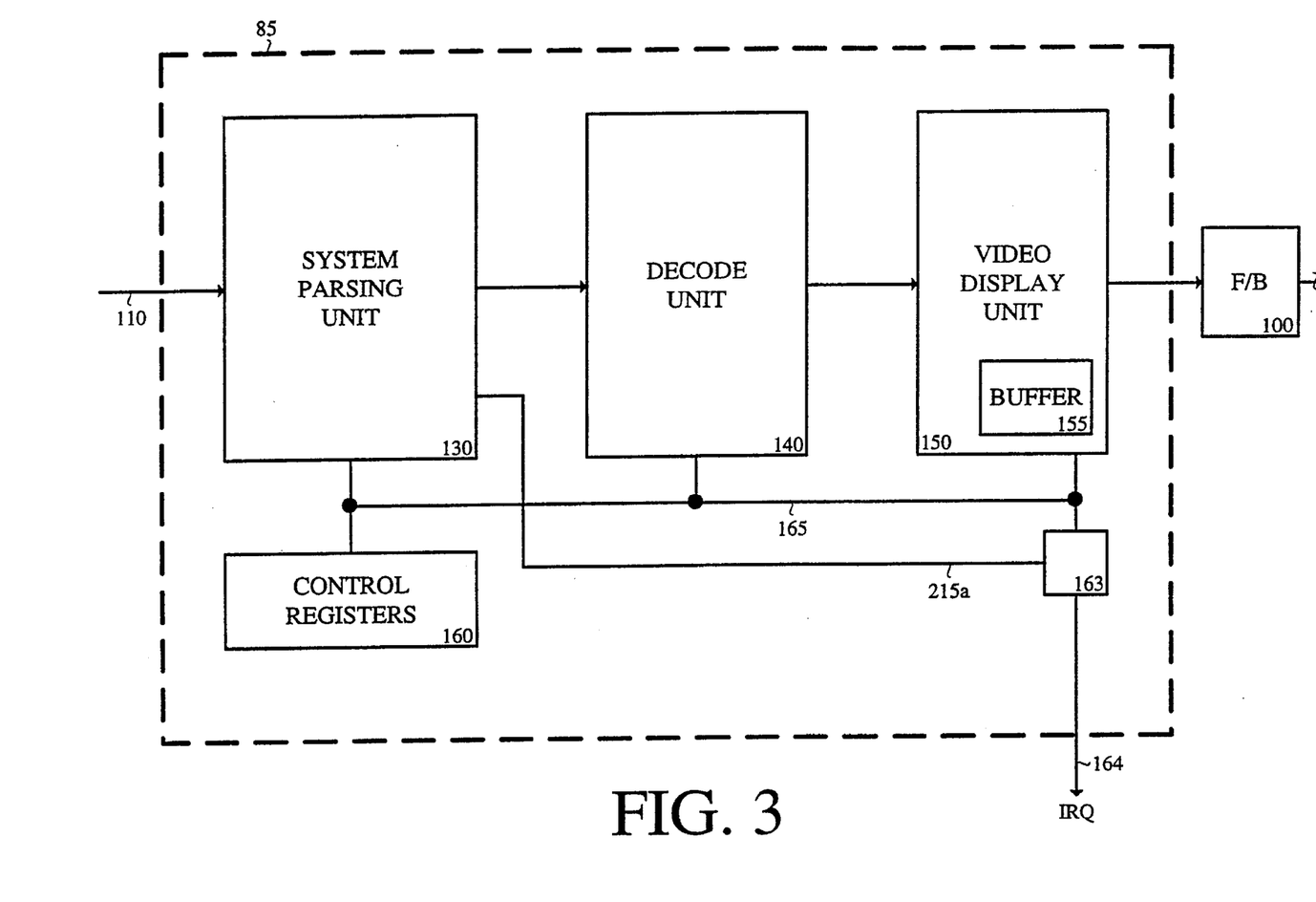
FIG. 3 is a logical block diagram illustrating hardware components of the video processor unit in accordance with the present invention.

FIG. 3 illustrates components of the video processor unit 85 used by the present invention. MCI driver 15 controls the supply of MPEG data to the video processor unit 85. Specifically, the video processor unit 85 signals the MCI driver 15 with threshold low interrupt signals to cause the MCI driver 15 to control MPEG information flow to the video processor unit 85.

In one exemplary implementation, the 5518 chip device supplied by Cirrus Logic of California can be used as the video processor unit 85. Video processor unit 85 contains a system parsing unit 130 which contains a buffer memory for receiving digital video MPEG data (which in one embodiment is supplied over address/bus 110). The system parsing unit 130 contains circuitry for interrogating compressed MPEG data packets to locate and identify video frames and their frame type (e.g., B, P or I class as defined by the above referenced MPEG specifications). The system parsing unit 130 also interrogates the compressed video MPEG data to determine the video presentation time stamp (VPTS) for each video MPEG data packet. The VPTS, as is known in the MPEG format, is a 33 bit binary number and represents the intended presentation time for a video frame and is based on a 90 kHz system clock.

The system parsing unit 130 outputs a compressed video MPEG signal to a decode unit 140 which contains circuitry for (1) decompressing and (2) decoding the input compressed video MPEG signal. The decompression and decoding functions performed by the decode unit 140 are in accordance with the MPEG specifications as referenced above. Decode unit 140 reconstructs presentation units (e.g., pictures) from compressed data and forwards them in a synchronized sequence according to their presentation times. The decode unit 140 outputs a decoded and decompressed video MPEG signal to a video display unit 150. The video frames output by the decode unit 140 are in playback sequence. The video display unit 150 contains a relatively limited size data buffer 155 (e.g., a 3 to 4 frames in size) and is used to transfer the decompressed and decoded video frames to the F/B unit 100 for rendering on the display unit 95 (see FIG. 2).

The video processor unit 85 of FIG. 3 of the present invention also contains a set of control registers containing memory locations (e.g., bits) for storing a frame pause indicator and a frame skip indicator. Control register 160 also contains a video time counter (e.g., 33 at 90 kHz) representative of the video frame display. Control register 160 is coupled to system parsing unit 130, decode unit 140 and the video display unit 150 via control bus 165. A control and interrupt generation (CIG) circuit 163 is also coupled to control bus 165. CIG circuit 163 is also coupled to system parsing unit 130 via line 215a. CIG circuit 163 generates an interrupt request over line 164 to processor 60 (FIG. 2) of the playback system 50 to interrupt MCI driver 15 and performs other control features described below.

Figure 4:
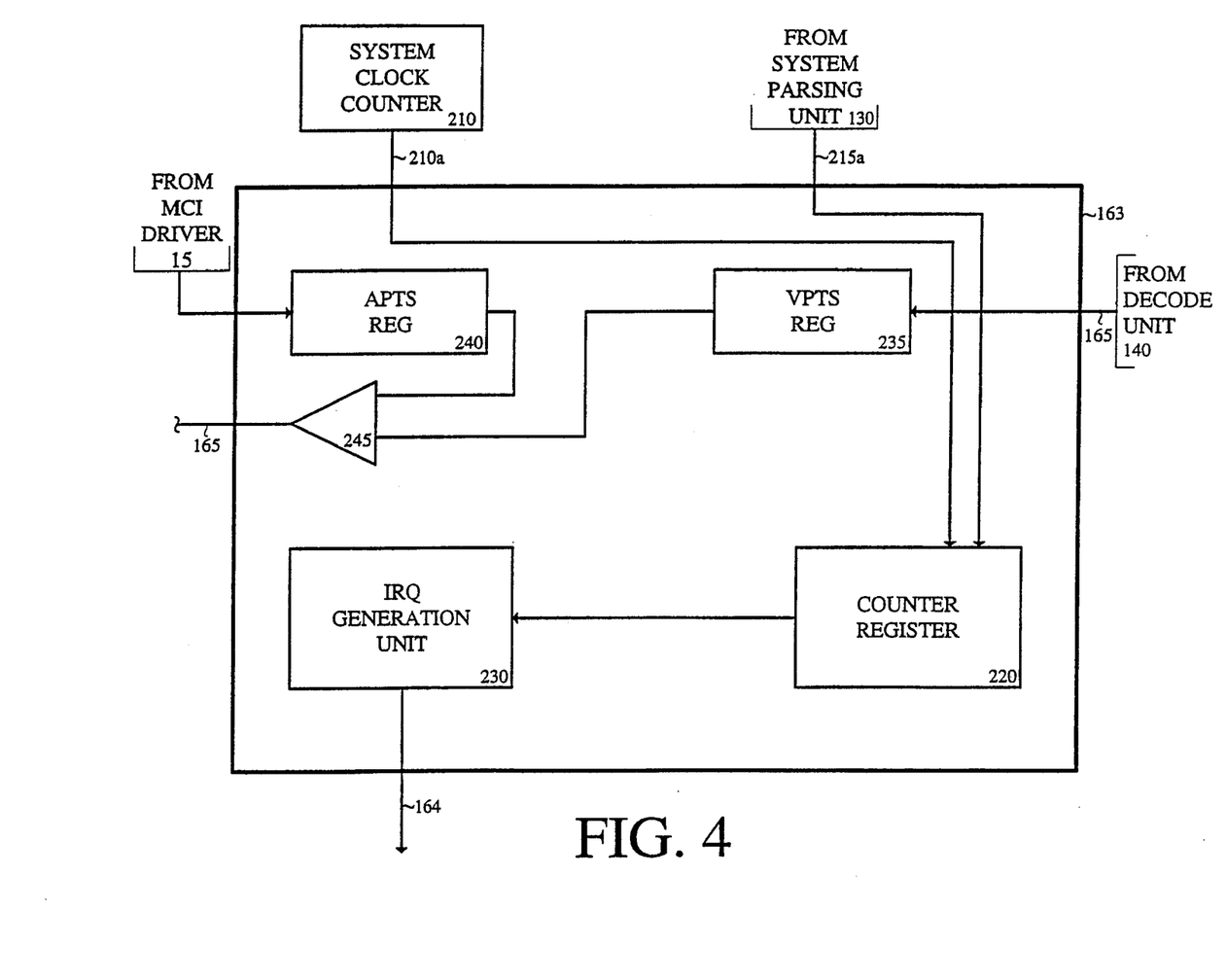
FIG. 4 shows a logical block diagram of the hardware components of the control and interrupt generation unit of the video processor unit used within the present invention.

FIG. 4 shows elements of the CIG circuit 163 of the video processor unit 85. CIG circuit 163 receives a digital input over line 210a indicating the value of the system clock maintained by the system clock counter circuit 210. In this embodiment of the present invention, the system clock counter 210 is slaved to the audio time counter and is a 33 bit value based on a 90 kHz frequency. Signal 210a is coupled to a counter register 220. Counter register 220 is also coupled to line 215a. A VPTS register 235 is coupled to control bus 165 to receive the current VPTS value from the decode unit 140. The VPTS register 235 receives and stores the current video presentation time stamp (VPTS) for the currently playing video frame. As discussed above, this information originates from the decode unit 140 in the preferred embodiment, as shown, but can alternatively be supplied from other circuitry of the video processor unit 85 (e.g., the video display unit 150). VPTS register 235 is coupled to an input of a comparator 245 which also receives an input from an APTS register 240. APTS register 240 is configured to receive data from MCI driver 15. The output of the comparator 245 is carried over control bus 165 and specifically this output is supplied to the interrupt generation unit 230 over control bus 165. The counter register 220 is coupled to an interrupt generation unit 230 which generates an output over line 164. Among the other features performed by an interrupt from the interrupt generation unit 230, one such interrupt informs the MCI driver 15 when the internal input buffers of the video processor unit 85 are empty or near empty as specified by the control registers.

As described in more detail to follow, during software controlled synchronization in accordance with the present invention, the counter register counts frames skipped or paused by the video processor unit 85 and the interrupt generation unit 230 generates a interrupt over line 164 for each frame encountered. During hardware controlled synchronization, in accordance with the present invention, comparator 245 determines if the audio signal is ahead, behind or in synchronization with the video signal.

Playback Synchronization of the Present Invention

Given the above described hardware and software environment, the audio/video MPEG synchronization procedure 300 of the present invention utilizes hardware and software controlled steps to synchronize the video MPEG data to the audio MPEG data which is used as a reference. In so doing, the present invention pauses or skip video data in order to synchronize the video data to the reference audio data. Audio data is used as the reference signal to avoid unwanted distortion (e.g., skips, pops, hiss, etc.) in the audio playback. Procedure 300 assumes that application 10 has already selected the audio/video playback file, the MCI driver 15 has opened and accessed the audio/video playback file, and playback system 50 is initialized and has commenced playing back the audio/video playback file. During the playback process, procedure 300 operates to synchronize the audio and video signals during playback to avoid unwanted audio/video distortion attributed to signal off-synchronization.

It is appreciated that the steps of synchronization procedure 300 are implemented as program code stored within computer readable memory units (e.g., 65 and/or 70) of the playback system 50.

Figure 5:
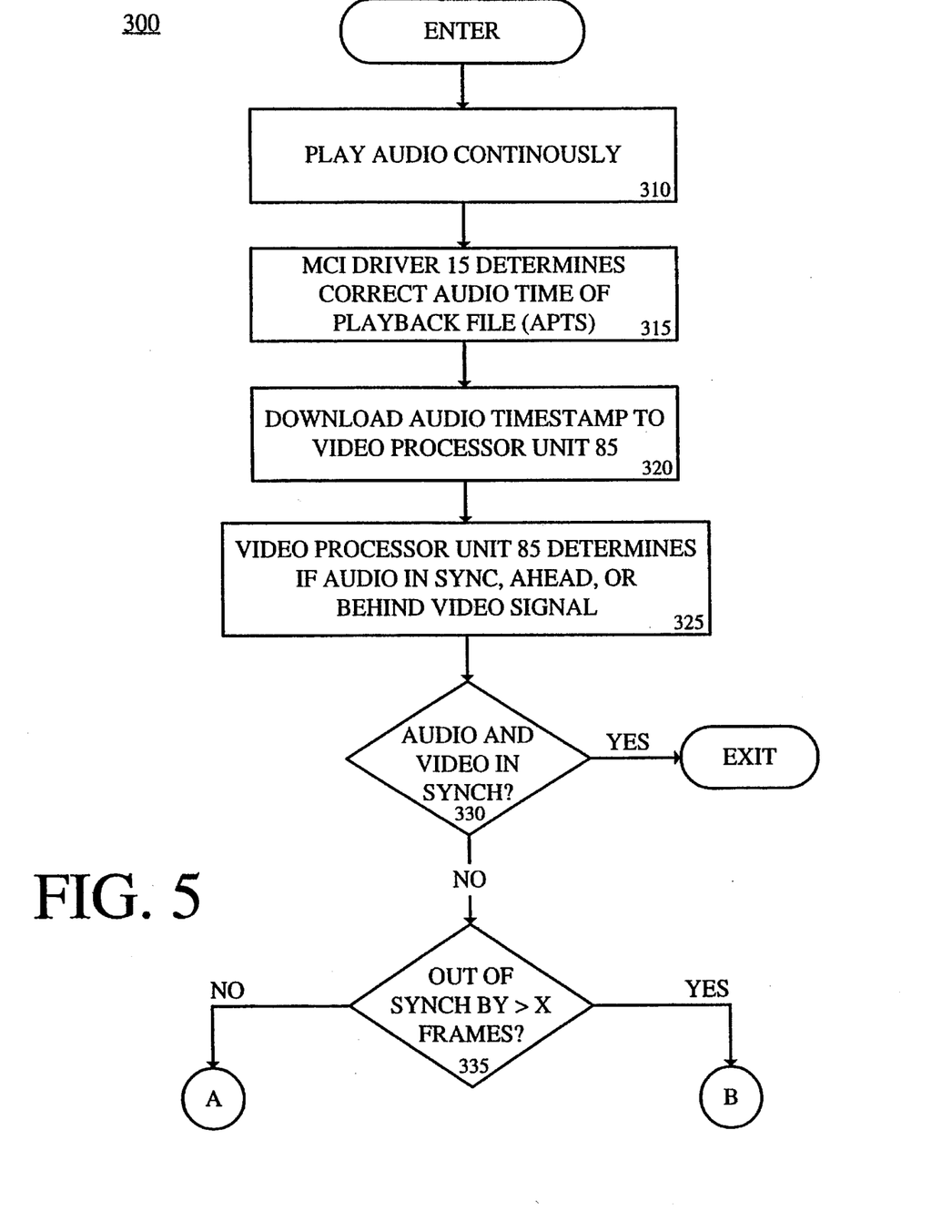
FIG. 5 is an initial portion of a flow diagram of the audio/video data synchronization procedure of the present invention.

FIG. 5 illustrates a first portion of the synchronization procedure 300 of the present invention. Procedure 300 is cyclically processed at a user selected frequency. During each cycle, the process 300 enters at step 310 where the audio signal is not disturbed but is rather allowed to play continuously as a reference signal. At block 310, MPEG audio data is decompressed by audio software decompressor 25 (FIG. 1) and then processed by the low level wave audio driver 30 and then processed by the audio processor unit 80 which generates an audible signal.

At step 315 of FIG. 5 the present invention directs the MCI driver 15 to determine the current reference time by determining the audio presentation time stamp (APTS) of the current playback file. Step 315 is performed by the MCI driver 15 issuing a GET APTS function call which is answered by the audio software decompressor 25 in the preferred embodiment but can also be answered by the audio processor unit 80 (FIG. 1) in alternative embodiments. The result of the GET APTS function call is a 33 bit value indicating the intended presentation time of the currently processed audio data packet in MPEG format. The format and function of the presentation time stamp (PTS) is described in more detail in section 2.4.4.2 of the ISO/IEC 11172-1 1993 (E) MPEG specification.

At step 320 of FIG. 5, the present invention then instructs the MCI driver 15 to download the current APTS to the video processor unit 85. Specifically, the APTS is downloaded into APTS register 240 (FIG. 4) of the video processor unit 85. The VPTS register 235 (FIG. 4) contains the current video time stamp (VPTS) information. At step 325, the video processor unit 85 determines if the video signal is in synchronization with the audio signal or if the video signal is ahead or behind the audio signal. This is performed by comparator circuit 245 (FIG. 4) which generates an indicating signal over control bus 165.

At step 330 of FIG. 5 the comparator 245 (FIG. 4) of the video processor unit 85 determines if the audio and video signals are in synchronization (e.g. the APTS and the VPTS are within a frame of each other). If so, the video processor unit 85 exits process 300 and the process 300 executes again at some predetermined frequency. If the video and audio signal are out of synchronization, the comparator 245 determines of the number of frames, n, that are out of synchronization. At step 330, if the audio and video signals are not in synchronization, then at step 335 the video processor unit 85, via comparator 245, determines if the number of frames, n, that the audio and video signals are out of synchronization exceeds a small number of frames, x. In the preferred embodiment x is about 3 and 4, but can vary within the scope of the present invention depending on the size of buffer 155 (FIG. 3). If the audio and video signals are out of synchronization by more than x frames, then processing continues to B (FIG. 7) otherwise processing continues to A (FIG. 6).

Figure 6:
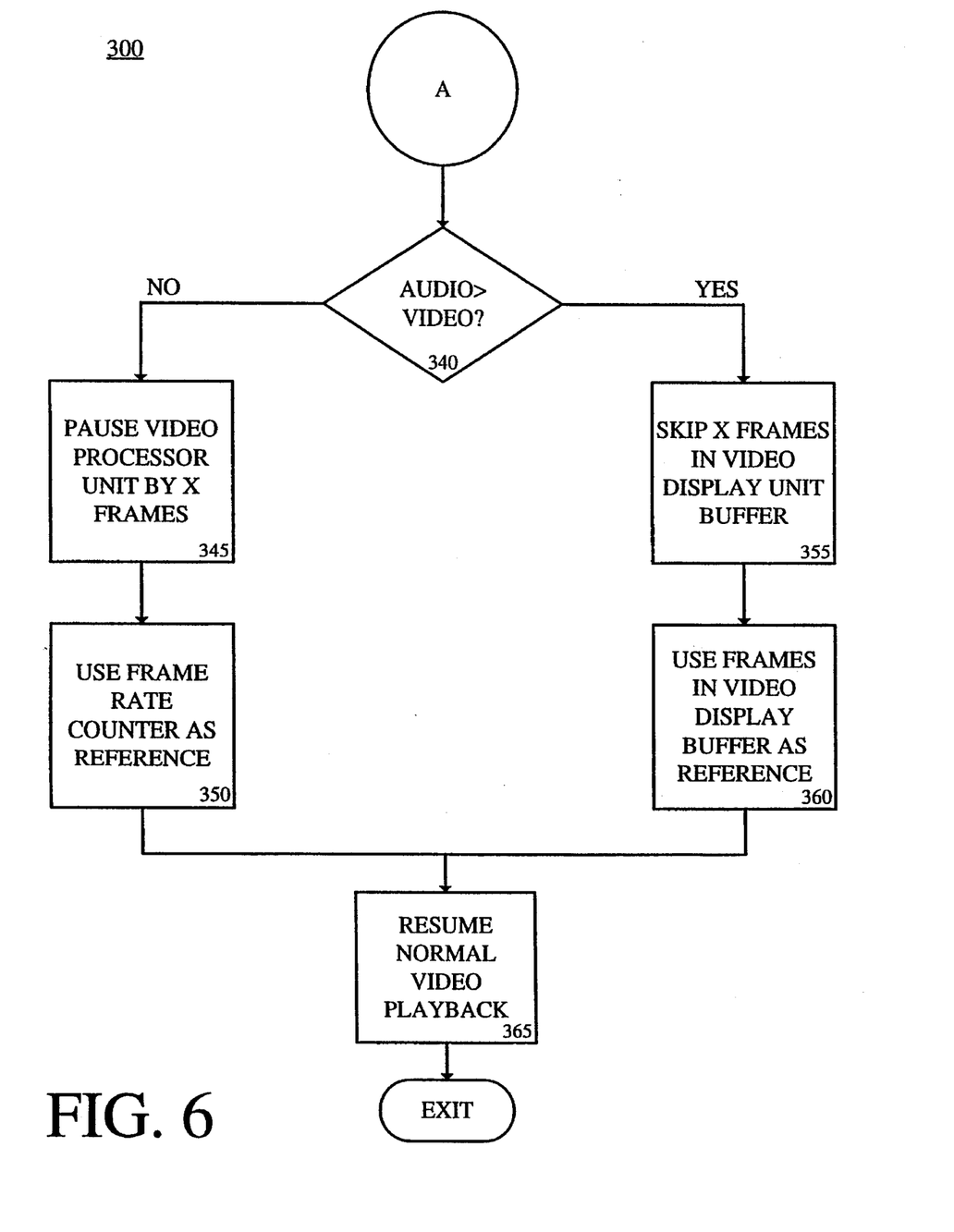
FIG. 6 is a portion of a flow diagram of the audio/video data synchronization procedure of the present invention wherein audio/video data synchronization is hardware controlled for off-synchronization of less than or equal to x frames.

FIG. 6 illustrates the hardware initiated and performed steps of process 300 of the present invention for the case where the audio and video signals are out of synchronization by x or fewer frames. At step 340, the audio processor unit 85 determines if the audio signal is ahead or behind the video signal. This information originates from the comparator 245. If the audio signal is ahead of the video signal, then processing flows to step 355 wherein the video display unit 150 is instructed by the CIG circuit 163 (via control bus 165) to skip n number of video frames within its internal buffer 155 (FIG. 3). There are a number of well known circuits that can be used to cause the buffer 155 to skip n decoded and decompressed video frames that are stored therein allowing the video signal to catch up with the audio signal. As described in step 360, the above skip step 355 uses the information stored in buffer 155 to reference the video frames that are skipped. Step 360 and step 355 occur simultaneously.

If the audio signal is behind the video signal, then at step 345 of FIG. 6, an indicating a signal is asserted over control bus 165 via CIG circuit 163 and the video processor unit 85 pauses itself for n frames so that the audio signal can catch up with the video signal. During the video pause, the system parsing unit 130, the decode unit 140, and the video display unit 150 are paused and the video time counter is not updated. Also during the video pause, the video display unit 150 outputs the same video frame to the F/B unit 100 which is therefore not refreshed, causing its image to remain on the display screen 95 during the video pause duration. During the video pause of step 345, step 350 indicates that the present invention uses the system clock value from the system clock counter 210 (FIG. 4) as a reference to measure the n paused frames. Step 345 and step 350 occur simultaneously. Steps 350 and 360 flow to step 365. At step 365, when n frames are paused or skipped, as indicated by the CIG 163, a signal is generated over the control bus 165 to resume normal video playback within the audio processor unit 85 and process 300 is exited.

The steps of FIG. 6 provide an effective method for synchronization of the audio and video signals which is solely performed and initiated by video processor unit 85 in hardware without requiring the attention of the software components of the system (e.g., the MCI driver 15 or of application 10). For cases in which the audio and video signals are out of synchronization by x or less frames, the present invention provides a synchronization procedure that requires no software interruption.

Figure 7:
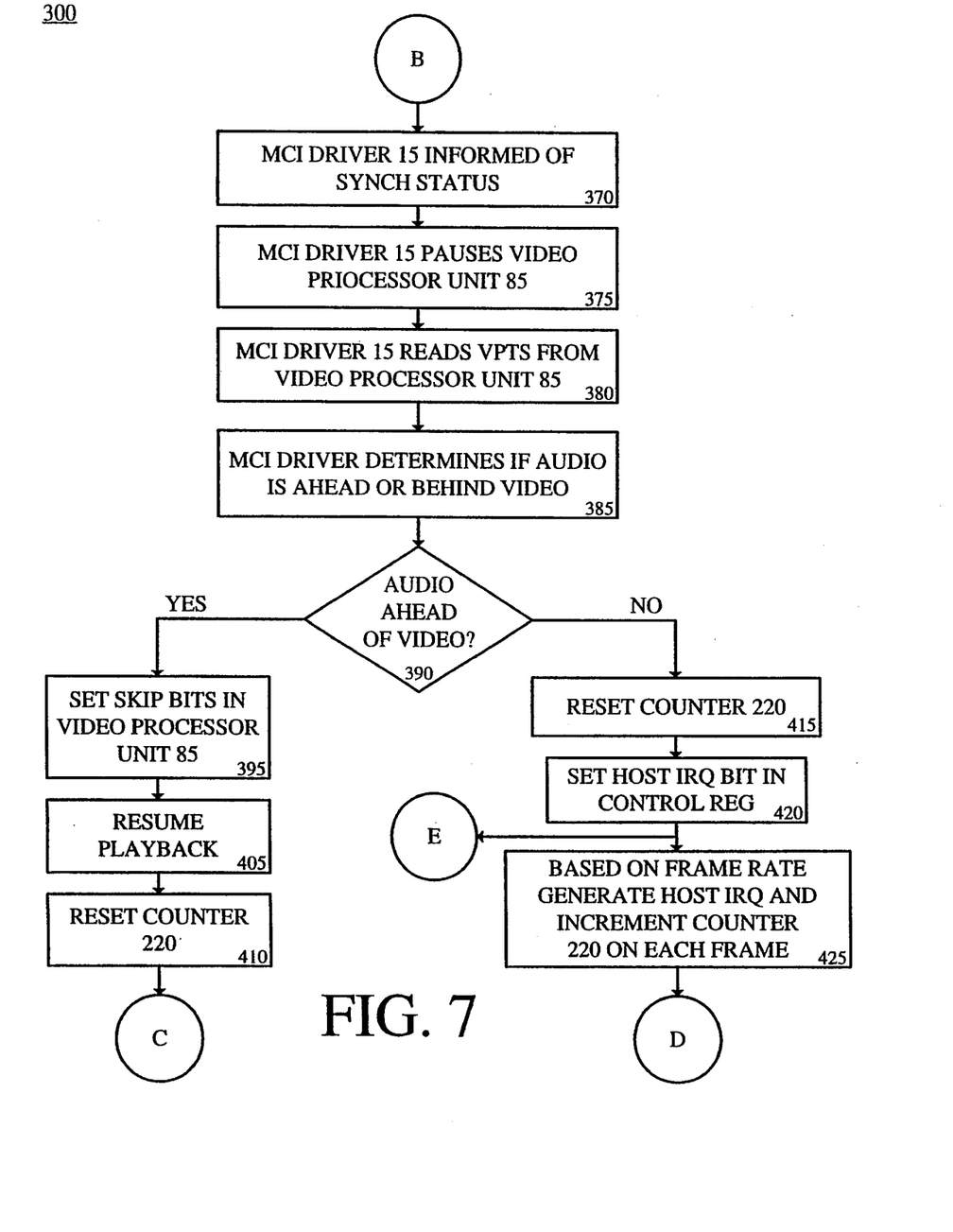
FIG. 7 is a portion of a flow diagram of the audio/video data synchronization procedure of the present invention wherein audio/video data synchronization is software controlled for off-synchronization of more than x frames.

FIG. 7 illustrates the steps of process 300 of the present invention for the case where the audio and video signals are out of synchronization by more than x frames. In this case, the MCI driver 15 instructs the video processor unit 85 to perform different synchronization procedures to (1) pause or (2) skip frames within the parsing unit 130 while interrupting the MCI driver 15 on a frame basis until the MCI driver 15 indicates completion.

Specifically, at step 370 of FIG. 7, the hardware video processor 85 informs the MCI driver 15 (e.g., via an interrupt) that the video and audio signals are out of synchronization by more than x frames (e.g., n>x). The value, n, is read by the interrupt generation unit 230 over bus 165 and the interrupt generation unit 230 generates the appropriate interrupt to the MCI driver 15. At step 375, the MCI driver 15, in response to the interrupt, pauses the video processor unit 85 by setting pause bits within the control register 160 of the video processor unit 85 (FIG. 3) causing a pause signal to be asserted over control bus 165. During video pause step 375, the system clock maintained by the system clock counter 210 (FIG. 4) is used as a reference while the decode unit 140 (FIG. 3), the system parsing unit 130, and video display unit 150 are paused and the video time counter is not updated. The video display unit 150 does not update the F/B unit 100.

At step 380 of FIG. 7, the VPTS value from the VPTS register 235 (FIG. 4) is read by the MCI driver 15. At step 385, the MCI driver determines if the audio signal is ahead or behind the video signal and itself determines the number of relevant frames (e.g., n) ahead or behind. At step 390, if the audio signal is ahead of the video signal, process 300 flows to step 395. At step 395, the MCI driver 15 sets skip bits in the control register 160 of the video processor unit 85 and video play back is resumed at step 405. At step 410 counter register 220 (FIG. 4) is reset.

Figure 8:
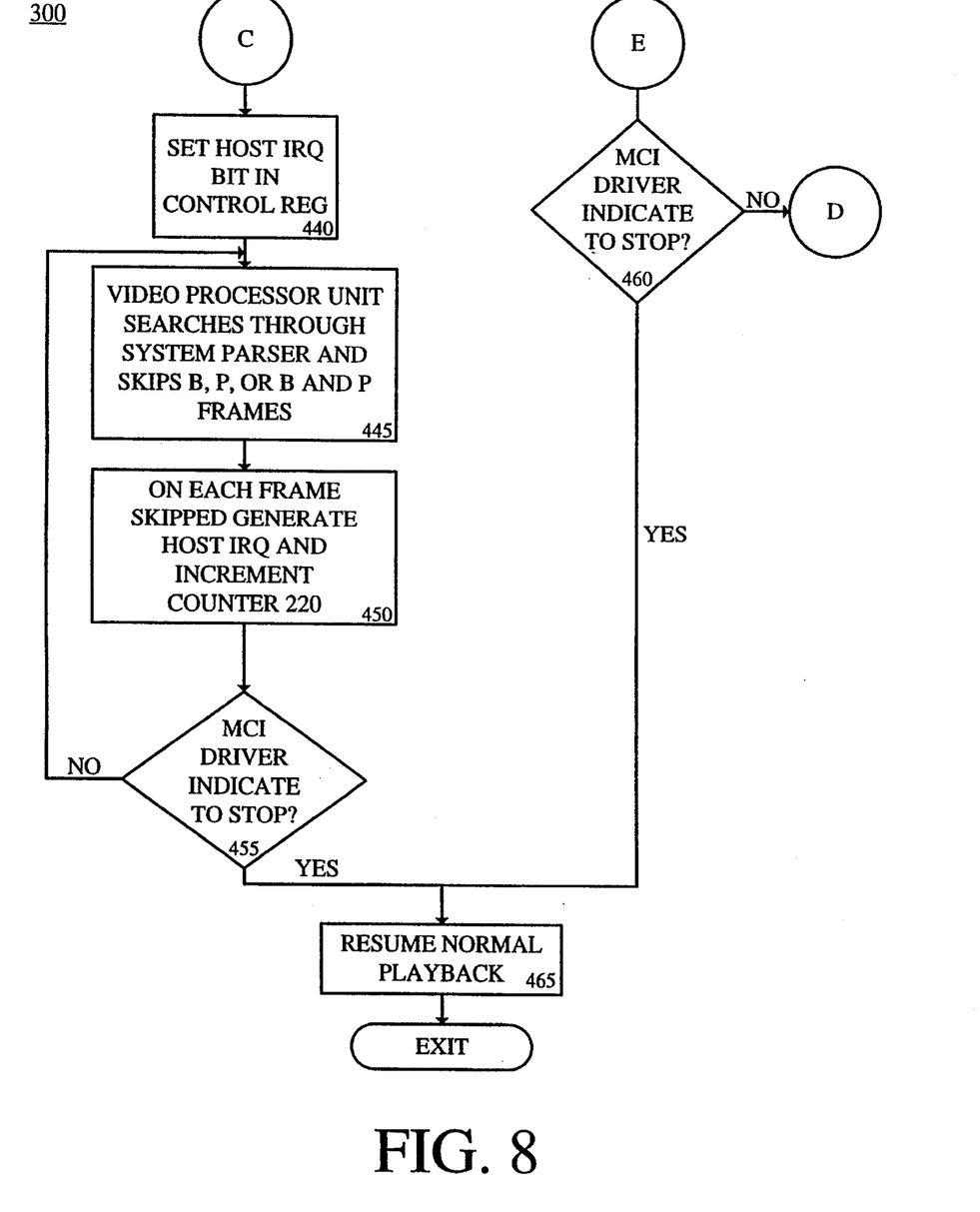
FIG. 8 is a flow diagram continuation of the flow diagram of FIG. 7.

The present invention then enters step 440 of FIG. 8. At step 440, a host interrupt (irq) bit is set in control register 160 (FIG. 3) allowing the interrupt generation unit 230 (FIG. 4) to interrupt the MCI driver 15 based on the counter register 220. At step 445, a skip signal is asserted over control bus 165 and the video processor unit 85 causes the system parsing unit 130 to search through the video information stored therein to identify the video frame boundaries. During step 445, the system parsing unit 130 skips any B, P or B and P video frames that it encounters. The B, P and B and P frames are well defined within the above referenced MPEG specifications. Methods and circuitry used by the system parsing unit 130 to search for B, P and B and P video frames are well known in the art. At step 450, on each video frame that is skipped by the system parsing unit 130, the system parsing unit 130 of the video processor unit 85 updates the value of the counter register 220 (FIG. 4) over line 215a. At step 450, the video processor 85 also instructs the interrupt generation unit 230 to generate an interrupt to the MCI driver 15 (a host interrupt) each time counter register 220 is updated. This allows the video processor unit 85 to skip one video frame for each interrupt generated. The interrupt generated by interrupt generation unit 230 causes the MCI driver 15 to perform its interrupt service routine 500 described in more detail with reference to FIG. 9.

At step 445 of FIG. 8, the video processor unit 85 checks its control register 160 (FIG. 3) to determine if the MCI driver 15 indicated that steps 445 and 450 should complete. If no completion is indicated, processing flows to step 445 to skip another video frame. If a complete is indicated at step 445, the MCI driver 15 instructs the video processor unit 85 to perform normal playback at step 465 by resetting the skip bits of the control register 160 and disabling the counter register 220 from signaling the interrupt generation unit 230. The F/B unit 100 is then updated again. Process 300 then exits.

At step 390 of FIG. 7, the present invention enters step 415 if the audio is not ahead of the video. At step 415, the MCI driver 15 resets the counter register 220 (FIG. 4). At step 420, the MCI driver sets the host interrupt bit in the control register 160 (FIG. 3) enabling the interrupt generation unit 230 to be signaled by counter register 220. At this point, it is appreciated that the video processor unit 85 is paused (e.g., from step 375 of FIG. 7). At step 425, based on the system clock, as maintained by the system clock counter 210 (FIG. 4), the video processor unit 85 generates a host interrupt to the MCI driver 15 for each frame count indicated by the system clock counter 210. It is appreciated that MPEG video data is not sequentially presented but is nevertheless presented at a constant frame rate and the system clock counter 210 is slaved to the audio time counter. On each frame count, the counter register 220 is updated causing interrupt generation unit 230 to generate an MCI driver 15. This allows the video processor unit 85 to pause one video frame for each interrupt generated. The interrupts generated by step 425 are serviced by the interrupt service routine 500 of the MCI driver 15 described with reference to FIG. 9.

Processing flows to step 460 of FIG. 8 where the video processor unit 85 checks if the MCI driver 15 indicated that step 425 should complete. If not, flow returns to step 425. If so, processing flows to step 465 which is described above. Process 300 then exits.

Figure 9:
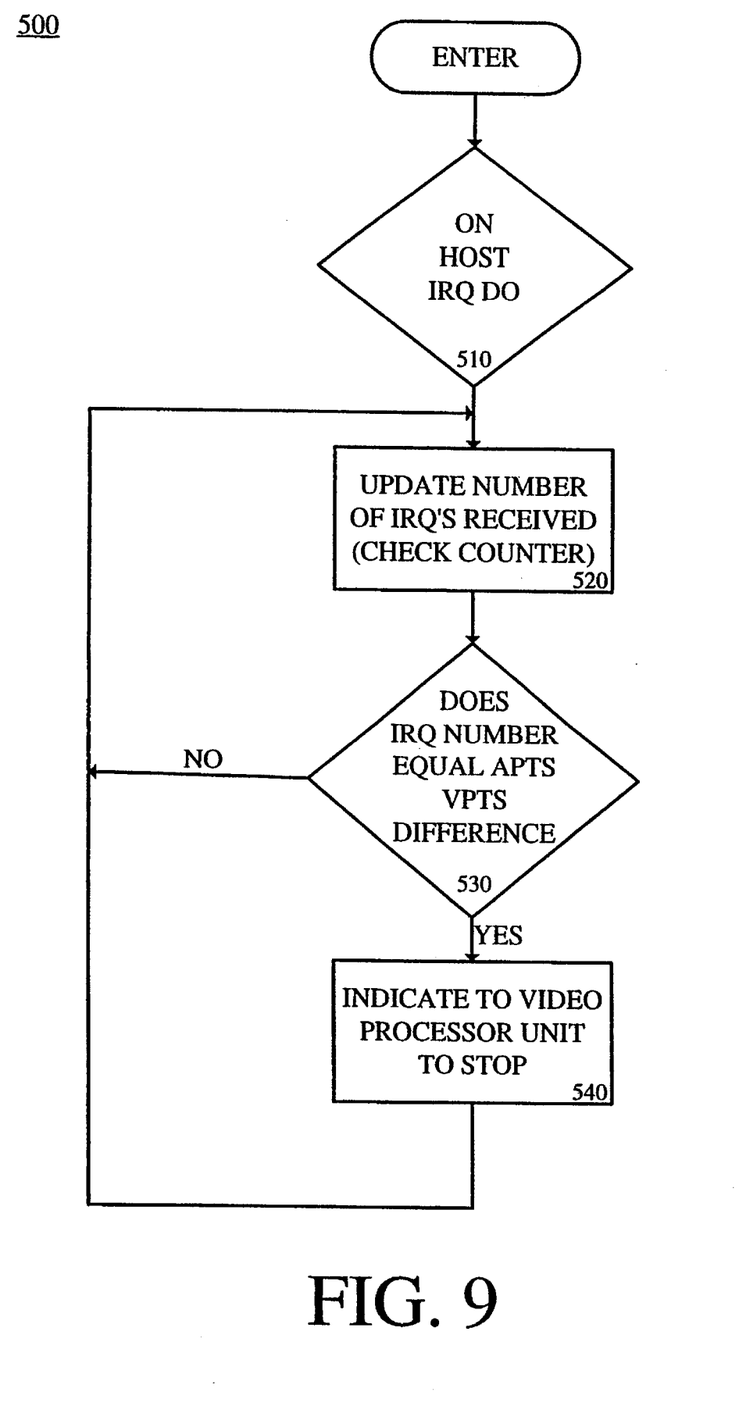
FIG. 9 is a flow diagram illustrating an interrupt service routine performed by an MCI driver during software controlled off-synchronization in accordance with the present invention.

FIG. 9 illustrates the interrupt service routine 500 of the present invention performed by the MCI driver 15 in response to the interrupts generated at step 450 and 425 of synchronization process 300. At step 510, the MCI driver 15 is free to perform other tasks until a interrupt is received. At step 510, when receiving the interrupt, the MCI driver 15 enters step 520. At step 520, in the preferred embodiment, the MCI driver 15 checks the interrupt count as maintained by the counter register 220. Alternatively, the MCI driver 15 can maintain its own count register in software to track the number of interrupts received during a skip or pause period. At step 530, if the interrupt number equals the frame difference between the audio and video signals (e.g., n frames), as determined by the MCI driver 15 at step 385 (FIG. 7), then step 540 is entered. If not, then processing returns to step 510 and, in the alternative embodiment where the MCI driver 15 is to maintain the interrupt count, the MCI driver 15 increments the interrupt count in software.

At step 540 of FIG. 9, the MCI driver 15 indicates to the hardware video processor 85 to complete its current skip or pause synchronization procedure. This is performed by setting a stop bit in the control register 160 (FIG. 3). Processing returns to step 510. In the alternative embodiment where the MCI driver 15 is to maintain the interrupt count, the MCI driver 15 resets the interrupt count in software at step 540.

The steps of FIG. 7, FIG. 8 and FIG. 9 provide an effective method for synchronization of the audio and video signals. The method is controlled by the software MCI driver 15 for cases in which the audio and video signals are out of synchronization by more than x frames. The software interaction with the synchronization process reduces the complexity and expense of the circuitry of the video processor unit 85 and adds design and compatibility flexibility to the video processor unit 85. The method uses an interrupt service routine to minimize the processing time required of the software and is jointly performed by the video processor unit 85 and the MCI driver 15. For cases in which the audio and video signals are out of synchronization by more than x frames, the present invention provides a synchronization procedure that requires minimal software interruption.

The preferred embodiment of the present invention, a method and system for audio and video synchronization during playback of digital audio and digital video signals particularly applicable to signals of the MPEG specification, is thus described. While the present invention has been described in particular embodiments, it should be appreciated that the present invention should not be construed as limited by such embodiments, but rather construed according to the below claims.

What is claimed is:

1. In a digital playback system including a video processor unit and a software driver, a method of synchronizing audio and video digital signals during playback thereof, said method comprising the steps of:
   (a) determining whether said audio and video digital signals are in synchronization or out of synchronization by a small number of frames, x, said step of determining performed by said video processor unit;
   (b) provided said audio and video digital signals are out of synchronization by x or less frames, performing a first step of synchronizing said video digital signal to said audio digital signal, said first step initiated and performed solely by said video processor unit; and
   (c) provided said audio and video digital signals are out of synchronization by more than x frames, performing a second step of synchronizing said video digital signal to said audio digital signal, said second step comprising the steps of:
      (i) said software driver instructing said video processor unit to perform a video frame synchronization procedure; and
      (ii) said video processor interrupting said software driver during said video frame synchronization procedure on a video frame basis until said software driver determines a completion point of said video frame synchronization procedure.

2. A method as described in claim 1 wherein said first step comprises the steps of:
   said video processor unit skipping x or less video frames within a buffer of a video display unit of said video processor unit provided said audio digital signal is ahead of said video digital signal, said video display unit containing decoded video data; and
   said video processor unit pausing x or less video frames, based on a system clock reference, provided said audio digital signal is behind said video digital signal.

3. A method as described in claim 1 wherein said step of said software driver instructing said video processor unit to perform a video frame synchronization procedure comprises the steps of:
   said software driver instructing said video processor unit to skip video frames within a system parsing unit containing decompressed video data, provided said audio digital signal is ahead of said video digital signal; and
   said software driver instructing said video processor unit to pause video frames, based on a system clock reference, provided said audio digital signal is behind said video digital signal.

4. A method as described in claim 3 wherein said step of said software driver instructing said video processor unit to skip video frames within said system parsing unit comprises the steps of:
   said software driver instructing said video processor unit to pause playback;
   said software driver setting skip bits in a control register of said video processor unit; and
   said software driver instructing said video processor unit to resume playback and skip x video frames.

5. A method as described in claim 3 wherein said step of said software driver instructing said video processor unit to pause video frames, based on said system clock reference comprises the steps of:
   said software driver instructing said video processor to pause playback; and said video processor unit pausing a system parsing unit, a decode unit and a video display unit over x video frames.

6. A method as described in claim 1 wherein said software driver is an MCI driver.

7. A method as described in claim 1 wherein said audio and video digital signals are of a Motion Picture Expert Group format.

8. A method as described in claim 1 wherein x is a value from 3 to 4.

9. A method of synchronizing audio and video signals of an MPEG format during playback thereof, said method comprising the steps of:

(a) determining whether said audio and video signals are in synchronization or out of synchronization by a small number of frames, x, said step of determining performed by a video processor unit;

(b) provided said audio and video signals are out of synchronization by x or less frames, performing a first step of synchronizing said video signal to said audio signal, said first step initiated and performed solely by said video processor unit; and (c) provided said audio and video signals are out of synchronization by more than x frames, performing a second step of synchronizing said video signal to said audio signal, said second step comprising the steps of:

(i) instructing said video processor unit, via a software driver, to perform a video synchronization procedure to skip video frames and pause video frames to synchronize to said audio signal; and (ii) said video processor interrupting said software driver during said video synchronization procedure as individual video frames are skipped and paused until said software driver determines a completion point of said video synchronization procedure.

10. A method as described in claim 9 wherein said first step comprises the steps of:

said video processor unit skipping x or less video frames within a buffer of a video display unit of said video processor unit provided said audio signal is ahead of said video signal, said video display unit containing decoded video data; and said video processor unit pausing x or less video frames, based on a system clock reference, provided said audio signal is behind said video signal.

11. A method as described in claim 10 wherein said step of instructing said video processor unit, via a software driver, to perform a video synchronization procedure to skip video frames and pause video frames to synchronize to said audio signal comprises the steps of:

said software driver instructing said video processor unit to skip video frames within a system parsing unit containing decompressed video data, provided said audio signal is ahead of said video signal; and said software driver instructing said video processor unit to pause video frames, based on a system clock reference, provided said audio signal is behind said video signal.

12. A method as described in claim 11 wherein said step of said software driver instructing said video processor unit to skip video frames within said system parsing unit comprises the steps of:

said software driver instructing said video processor unit to pause playback;

said software driver setting skip bits in a control register of said video processor unit; and said software driver instructing said video processor unit to resume playback and skip x video frames.

13. A method as described in claim 11 wherein said step of said software driver instructing said video processor unit to pause video frames, based on said system clock reference comprises the steps of:

said software driver instructing said video processor to pause playback; and said video processor unit pausing a system parsing unit, a decode unit and a video display unit over x video frames.

14. A method as described in claim 10 wherein said software driver is an MCI driver.

15. A method as described in claim 10 wherein x is a value from 3 to 4.

16. A digital playback system for playing back audio and video signals of an MPEG format, said playback system including a computer system and further comprising:

(a) a video processor unit coupled to said computer system for determining whether said audio and video signals are in synchronization or out of synchronization by a small number of frames, x;

(b) said video processor unit, provided said audio and video signals are out of synchronization by x or less frames, also for performing a first step of synchronizing said video signal to said audio signal, said first step initiated and performed solely by said video processor unit; and (c) a software driver executable within said computer system, and provided said audio and video signals are out of synchronization by more than x frames, said software driver for initiating and controlling a second step of synchronizing said video signal to said audio signal by instructing said video processor unit to perform a video frame synchronization procedure and wherein said video processor is for interrupting said software driver during said video frame synchronization procedure on a video frame basis until said software driver completes said video frame synchronization procedure.

17. A system as described in claim 16 wherein said video processor unit comprises:

a video display unit having a buffer for storing decoded video data and wherein said video processor unit is for skipping x or less video frames within said buffer provided said audio digital signal is ahead of said video digital by x or less frames; and a system clock reference, wherein said video processor unit is for pausing x or less video frames, based on said system clock reference, provided said audio digital signal is behind said video digital signal by x or less frames.

18. A system as described in claim 17 wherein said video processor unit further comprises a system parsing unit containing decompressed video data and wherein said software driver is for instructing said video processor unit to skip video frames within said system parsing unit as a first part of said video frame synchronization procedure, provided said audio digital signal is ahead of said video digital signal by more than x frames; and wherein said software driver is also for instructing said video processor unit to pause video frames, based on said system clock reference as a second part of said video frame synchronization procedure, provided said audio digital signal is behind said video digital signal by more than x frames.

19. A system as described in claim 18 wherein said audio and video digital signals are of a Motion Picture Expert Group format.

20. A system as described in claim 18 wherein x is a value from 3 to 4.

* * * * *